United States Patent [19]

Scobie

[11] Patent Number: 4,967,779

[45] Date of Patent: Nov. 6, 1990

[54] METHOD OF INSTALLING A VALVE SEAT IN A VALVE BODY

[75] Inventor: William B. Scobie, Houston, Tex.

[73] Assignee: Keystone International Holdings Corp., Houston, Tex.

[21] Appl. No.: 506,918

[22] Filed: Apr. 9, 1990

[51] Int. Cl.⁵ ............................................. F16K 43/00
[52] U.S. Cl. ..................................... 137/15; 137/315; 251/306; 251/317; 251/360
[58] Field of Search ...................... 137/15, 315, 454.2; 251/306, 317, 360

[56] References Cited

U.S. PATENT DOCUMENTS

| | | | |
|---|---|---|---|
| 2,809,060 | 10/1957 | Thompson | 251/306 |
| 2,994,342 | 8/1961 | Stillwagon | 137/454.2 |
| 3,241,806 | 3/1966 | Snell, Jr. | 251/306 |
| 3,253,815 | 5/1966 | Stillwagon | 251/306 |
| 3,692,276 | 9/1972 | Conners et al. | 251/306 |
| 4,176,675 | 12/1979 | Liberman | 251/306 |
| 4,289,297 | 9/1981 | Nakanishi | 251/306 |
| 4,685,611 | 8/1987 | Scobie et al. | 251/317 |
| 4,699,357 | 10/1987 | Sisk | 251/306 |

Primary Examiner—George L. Walton
Attorney, Agent, or Firm—Browning, Bushman, Anderson & Brookhart

[57] ABSTRACT

A method of installing a valve seat in a valve body wherein the valve body is provided with an annular, radially inwardly extending rib defining a circular opening through the valve body and the seat member is an annular member having an annular extending web, a first annular flange extending radially outwardly from a first end of the web and a second annular flange extending radially outwardly from a second end of the annular web to thereby define an annular extending, outwardly opening channel which receives the rib in the body, the method comprising rigidly positioning the valve body forming a loop of flexible cord around the seat, the loop being at least partially received in the channel to produce first and second segments of the cord, positioning the seat partially in the body such that a portion of the rib which is received in a portion of the channel, extending the first and second segments of the cord through the valve body out of the second end of the valve body, simultaneously pulling the first and second segments in a direction which urges the engaged portions of the seat and the rib together while effecting radial collapse of the seat sufficient to allow the second flange member to pass through the opening defined by the annular rib and then removing the first and second segments of the cord by pulling in a direction away from the second end of the valve body and from the initial engaged position of the rib and the seat.

4 Claims, 2 Drawing Sheets

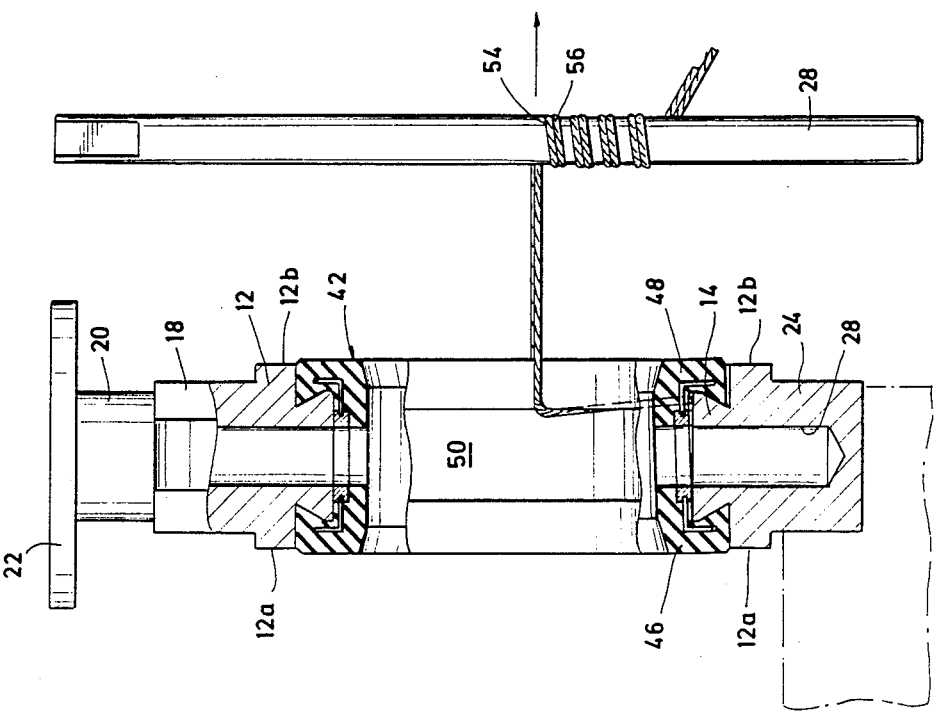
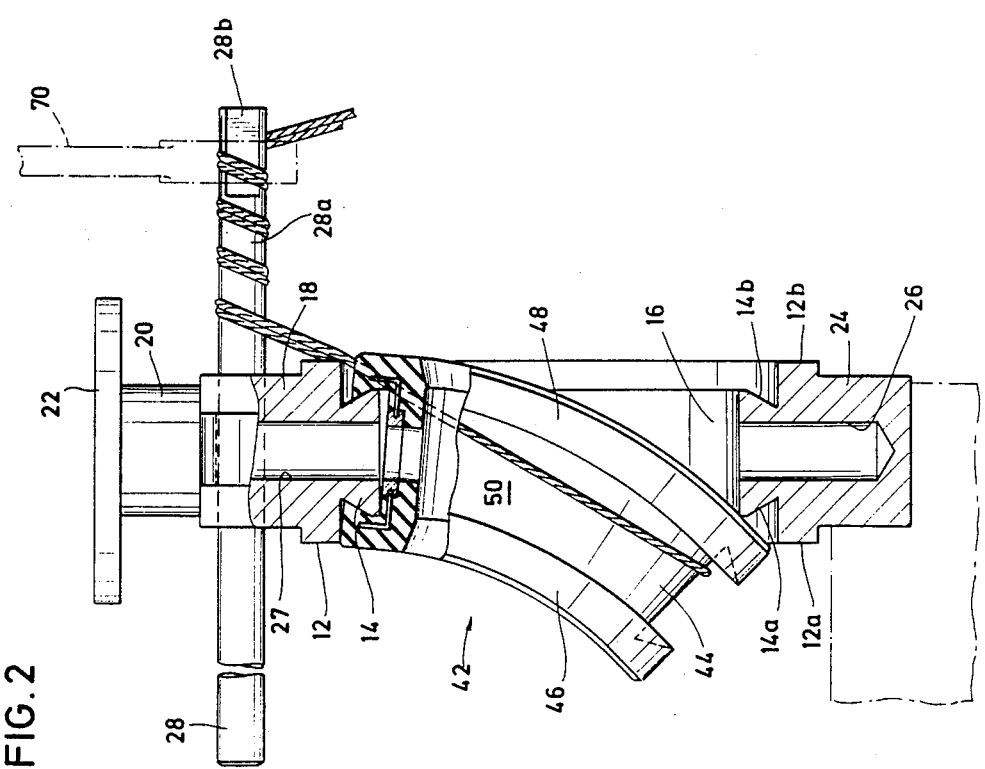

METHOD OF INSTALLING A VALVE SEAT IN A VALVE BODY

BACKGROUND OF THE INVENTION

1. Field of the Invention

The present invention relates to a method of installing a valve seat in a valve body and, more particularly, to a method of installing an annular valve seat having a radially outwardly opening, annular channel into a valve body having a radially inwardly projecting, annular rib such that the annular rib is received in the channel.

2. Description of the Background

In a conventional butterfly valve, the valve seat against which the disk seals is made of an elastomeric material, such as rubber, and is disposed in a valve body which generally encircles the valve seat. A typical example of such a butterfly valve is shown in U.S. Pat. No. 2,994,342 in which the valve has a body with a radially inwardly extending, annular, dove-tail rib, and an elastomeric seat having an annular web with two radially outwardly extending annular flanges, the web and flanges defining a radially outwardly opening channel, complementary in shape to that of the rib. Accordingly, when the seat is received in the valve body, there is interlocking between the valve body and the elastomeric seat, the annular web serving also as a reinforcement or backup to the relatively soft resilient seat.

In U.S. Pat. No. 4,685,611 there is shown an improved butterfly valve assembly in which the seat includes a rigid reinforcing member which is bonded to and generally embedded in the seat but which, like the seat described above, forms an annular, radially outwardly opening channel which, when emplaced in the valve body, receives the annular rib. Seats made in accordance with U.S. Pat. No. 4,685,611, while still retaining sufficient flexibility to be inserted into a valve body having an annular rib as described above, are nonetheless more rigid than an unreinforced seat, such as is shown in U.S. Pat. No. 2,994,342. This is particularly true in smaller valve sizes, e.g. 4" and less, where even the unreinforced valve seats exhibit considerable rigidity.

Heretofore, in installing the reinforced valve seats, particularly in the smaller sizes mentioned above, in field operations, e.g. to replace a worn out seat, it required considerable manual effort to install the valve seats in the valve body. primarily because of the fact that it is difficult to manually, radially collapse the valve seat sufficiently to allow the reinforced valve seat to be placed in the valve body and have the channel receive the rib.

Summary of the Invention

Accordingly, it is an object of the present invention to provide an improved method for positioning a flexible, reinforced valve seat having an annularly extending, radially outwardly opening channel in a valve body which has an annularly extending, radially inwardly projecting, annular rib, such that the rib is received in the channel.

Another object of the present invention is to provide such a method which minimizes strain and possible injury to the worker installing the valve seat.

The above and other objects of the present invention will become apparent from the drawings, the description given herein and the appended claims.

The method of the present invention is used to install a valve seat in a valve body which has a first end and a second end and an annular, radially inwardly extending rib which defines a circular opening through the valve body, the annular rib having a first axial face and a second axial face. The seat comprises an annular member having an annularly extending web, a first annular flange extending radially outwardly from a first end of said web and a second annular flange extending radially outwardly from the second end of said annular web to thereby define an annularly extending, radially outwardly opening channel. In the method, the valve body is rigidly positioned, e.g. by gripping in a vise. A loop of a flexible cord of sufficient strength is formed around the seat, the loop being at least partially received in the channel to thereby produce first and second segments of the cord and having first and second ends, respectively. The seat is then positioned in the body from the first end of the body such that a portion of the rib is received in a portion of the channel and at least a portion of the first annular flange engages at least a portion of the first axial face to form an engaged position between the seat and the body. The first and second segments of the cord are received through the valve body out of the second end of the valve body. The first and second segments are then simultaneously pulled in a direction which urges the engaged portions of the seat and the rib together with a force sufficient to collapse the seat enough to allow the greater portion of the second flange member to pass through the opening defined by the annular rib to thereby allow the annular rib to be received in the channel. The first and second segments of the cord are then pulled in a direction away from the second end of the valve body and the engaged position to thereby release the cord.

Brief Description of the Drawings

FIG. 2 is an elevational view, partly in section, showing the valve seat as it begins to radially collapse.

FIG. 3 is an elevational view, partly in section, showing the valve seat installed and removal of the cord.

Description of the Preferred Embodiment

Figure 1:
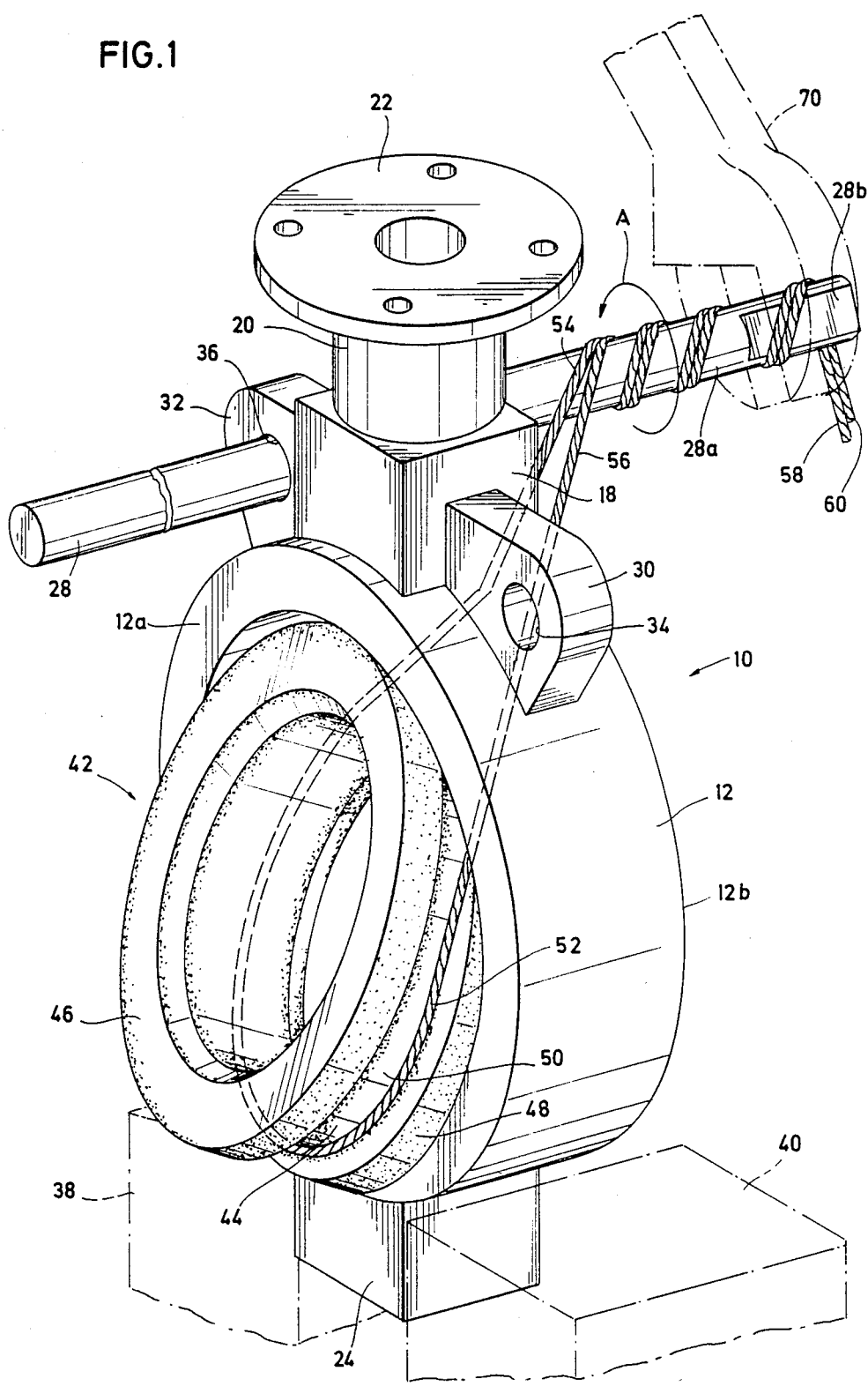
FIG. 1 is a perspective view showing generally commencement of the method.

Referring first to FIGS. 1 and 2, the valve, shown generally as 10, has a generally annular body 12 with a radially inwardly extending annular rib 14, rib 14 defining a generally circular opening or passageway 16 through the valve body 12. Valve body 12 also has a laterally outwardly projecting upper boss 18 to which is secured a circular neck portion 20. A mounting flange 22 is secured to neck portion 20 to permit a handle, actuator or the like, to be secured to the valve 10 for operation thereof. Valve 12 also has a lower boss 24 which is generally diametrically opposite boss 18. As best seen with reference to FIG. 2, boss 24 has a blind bore 26 which serves to receive the end of a shaft 28 shown as being used in the installation method of the present invention which is used to rotate the disk or valve element (not shown). Boss 18 together with neck 20 also define a bore 27 which is in register with bore 26 such that the valve shaft can be placed generally diametrically through the body 12. The shaft 28, when in place in the valve 10, extends through the registering bores 26 and 27 and is affixed to the disk. As noted, shaft 28, as shown hereafter, can conveniently be used in installing the valve seat in the valve body 12. The valve body 12 is also provided with ears or lugs 30 and 32 which are located on opposite sides of boss 18 and which have flange bolt locating holes 34 and 36, respectively. As can be seen, lugs 30 and 32 are disposed generally closely adjacent boss 18, i.e. generally at the upper portion of the valve body 12. For purposes of the description given herein, it is convenient to consider the portion of the valve body 12 which contains the neck 20 and flange 22 as the top or upper part of the valve body 12 whereas the portion of the body 12 that includes the boss 24 is the bottom or lower part of the valve body 12.

As seen in FIG. 1, the boss 24 is rigidly clamped between the jaws 38 and 40 of a vice or other suitable gripping device thereby securely holding the valve body 12 in a rigid, upright position.

The valve seat, shown generally as 42, comprises an annularly extending web 44, a first, radially outwardly extending annular flange 46 depending from one end of the annular web 44 and a second, radially outwardly extending, annular flange 48 extending laterally outwardly from the opposite end of the web portion 44. Web 44 in combination with the annular flanges 46 and 48 defines an annularly extending, outwardly opening channel 50. As can best be seen in FIG. 3, when the valve seat 42 is received in the valve body 12, annular rib 14 is received in the complementary-shaped channel 44. While as shown, annular rib 14 is of generally dovetail configuration in cross section, it will be appreciated that the rib can be rectangular or various other shapes to provide the mechanical interlocking between the valve seat 42 and the body 12.

In carrying out the method of the present invention, the valve is rigidly positioned as shown in FIG. 1 by rigidly clamping the valve, usually in an upright position. Following this, a suitable length of flexible cord 52 or other suitable flexible, substantially nonelastic member is used to form a loop, as shown in FIG. 1, around valve seat 42 such that the loop is at least partially received in the channel 50. By forming such a loop, there are provided first and second segments 54 and 56 of the cord 52 having first and second ends 58 and 60, respectively. The segments 54 and 56 are fed through the opening 16 in the valve body such that they extend out of the second end 12b of the valve body 12.

The valve seat 42, as shown in FIGS. 1 and 2, is then positioned in the body 12 in the first end 12a of the body such that at least a portion of the annular rib 14 is received in a portion of the channel 50. As best seen with reference to FIG. 2, the upper portion of the annular rib is received in an upper portion of the channel. In this position, a portion of the first annular flange engages a portion of the first axial face 14a of the annular rib 14 to thereby form an engaged position between the seat 42 and the rib 14. As can be seen with reference to FIG. 1, in the initial position of the installation procedure, the valve seat 42 is canted with respect to the body 12. The shaft 28 of the valve 10 is then positioned in the hole 36 in lug 32, the shaft having a first portion 28a which extends away from the second end 12b of the valve body 12. The segments 54 and 56 of the cord 52 are then wrapped around the shaft 28 in a clockwise manner. To secure the cord 52 to the shaft 28, portions of the segments 54 and 56 are wrapped around the wrench flats 28b of the shaft 28 and an adjustable wrench, shown in phantom as 70, is adjusted and positioned such that the cord segments 54 and 56 are trapped between the adjustable wrench 70 and the wrench flats 28a.

The wrench 70 is then rotated in a clockwise direction as shown by the arrow A. This rotation of wrench 70 results in clockwise rotation of shaft 28 with a clockwise winding of segments 54 and 56, simultaneously around shaft 28. In effect, winding of segments 54 and 56 of cord 52 amounts to a pulling of the segments of cord 52, from the second end of the valve in a direction which urges engaged portions of the rib 14 and flange 46 compressively together. As the rotation of shaft 28 continues, the force exerted by the cord 52 is sufficient to collapse the seat 42 in a generally radial direction to allow the greater portion of the second flange member 48 to pass through the opening 16 defined by the annular rib. At this point, the valve seat 42 will snap into place, the annular rib 44 being received in the channel 50.

The seat 42 having been positioned in the valve body 12, it is only necessary to remove the cord 52. To this end, a shaft 28 is removed from the hole 36 with the segments 54 and 56 still partially wrapped around the shaft 28. Shaft 28 is essentially used as a T-bar and the segments 54 and 56 are pulled in a direction away from the second end 12b of the valve body and the original engaged position between the rib 14 and the seat 42, i.e. generally the pulling is outwardly and downwardly. Pulling of the segments in this fashion serves to pull out any of the flange 48 which may not be received in the undercut portion of the rib 14. In other words, segments 54 and 56 of the cord 52 are pulled in a generally downward outward direction relative to the valve body 12 thereby ensuring that the flange portion 48 is completely clear of the rib 14 so that the rib 14 is fully received in the channel 50 in the valve seat 42.

While as described above, the valve shaft 28 is used as the bar or shaft around which the cord is wound, it will be appreciated that any shaft can be employed. Moreover, it is not necessary that the combination of a suitable lug hole or similar hole on a portion of the valve body and a shaft, such as shaft 28, be employed. Once the cord 52 is properly positioned, i.e. looped, around the seat 42, any pulling motion will suffice which will simultaneously pull the segments 54 and 56 in such a manner so as to urge the engaged portion of the seat 42 and the engaged portion of the rib 14 together with a force sufficient to collapse seat 42 enough such that the second flange 48 will pass through the opening 16 allowing the rib 14 to be received in the channel 50. However, use of the valve shaft 28, as shown, is most convenient for field use when it is necessary to change a worn seat.

The cord can be made of virtually any non-elastic material and need only have a strength sufficient to resist breaking when a force sufficient to collapse the valve seat is applied. Such cords can easily be fashioned from power mower starter cords, for example.

The foregoing disclosure and description of the invention is illustrative and explanatory thereof, and various changes in the method steps may be made within the scope of the appended claims without departing from the spirit of the invention.

What is claimed is:

1. A method for installing a valve seat in a valve body, the valve body having a first end and a second end and including an annular, radially inwardly extending rib defining a circular opening through the valve body, the annular rib having a first axial face and a second axial face, the valve seat comprising an annular member having an annularly extending web, a first annular flange extending radially outwardly from a first end of said web and a second annular flange extending radially outwardly from the second end of said annular web, an annularly extending, outwardly opening channel thereby being formed on said seat comprising:

rigidly positioning said valve body;

forming a loop of a flexible cord around said seat, said loop being at least partially received in said channel to thereby produce first and second segments of said cord having first and second ends, respectively; positioning said seat in said body from a first end of said body such that a portion of said rib is received in a portion of said channel and at least a portion of said first annular flange engages a portion of said first axial face to form an engaged position;

feeding the first and second segments through said valve body to said second end of said valve body;

pulling said first and second segments of said cord from said second end of said valve body in a direction which urges the engaged portions of said rib and said flange together with a force sufficient to collapse said seat sufficiently to allow the greater portion of said second flange member to pass through said opening defined by said annular rib such that said rib is received in said channel; and pulling said first and second segments in a direction away from said second end of said valve body and said position thereby ensuring that at least a portion of said second annular flange is in engagement with at least a portion of said second axial face to thereby release said cord.

2. The method of claim 1 wherein said valve body has a first boss portion and a second boss portion, said first boss portion being located diametrically opposite said second boss portion, and said valve is rigidly positioned by rigidly gripping said second boss portion.

3. The method of claim 2 wherein said valve body is provided with at least one hole forming member adjacent said first boss portion, said hole forming member defining a generally circular opening and including the steps of rotatably positioning a shaft in said hole such that said shaft has a first portion which extends in a direction away from said second end of said valve body, securing portions of said first and second segments of said cord to said shaft at a point distal said second end of said body and rotating said shaft member to effect winding of said cord around said shaft.

4. The method of claim 3 including the step of positioning an adjustable wrench member around said shaft so as to lock said portions of said first and second segments between said wrench member and said shaft and rotating said wrench member to effect rotation of said shaft.

* * * * *

UNITED STATES PATENT AND TRADEMARK OFFICE
CERTIFICATE OF CORRECTION

PATENT NO. : 4,967,779

DATED : November 6, 1990

INVENTOR(S) : William B. Scobie

It is certified that error appears in the above-identified patent and that said Letters Patent is hereby corrected as shown below:

Claim 1;
In Column 6, line 3, after "said" insert --engaged--.

Signed and Sealed this

Twenty-fifth Day of February, 1992

Attest:

HARRY F. MANBECK, JR.

*Attesting Officer*  *Commissioner of Patents and Trademarks*